Patented Sept. 18, 1951

2,567,955

UNITED STATES PATENT OFFICE 2,567,955

PREPARATION OF GUANIDINE THIOCYANATE

Nat H. Marsh, Noroton Heights, Conn., assignor to American Cyanamid Company, New York, N. Y., a corporation of Maine No Drawing. Application December 14, 1950, Serial No. 200,875

6 Claims. (Cl. 260—249.7)

The present invention relates to a method for the preparation of guanidine thiocyanate and melamine.

It has been known for some time that ammonium thiocyanate may be heated in a sealed tube to form guanidine thiocyanate and melamine in rather poor yields. It is also known that carbon disulfide and ammonium may be heated together to form ammonium thiocyanate. However, before the present invention it was not believed feasible to heat carbon disulfide and ammonia at temperatures high enough to dispense with the formation of the intermediate, ammonium thiocyanate, and go directly to the final products, owing to the poor yields of guanidine and melamine obtainable from ammonium thiocyanate.

The surprising discovery has now been made that guanidine thiocyanate can be prepared in excellent yield from carbon disulfide and ammonia.

It is an object of the present invention to prepare guanidine thiocyanate and melamine by reacting carbon disulfide and ammonia. It is a further object to prepare said products from carbon disulfide and ammonia without the separation of an intermediate. Still further objects will appear from the following description of the invention.

In brief, the invention contemplates the reaction of any proportion of carbon disulfide and ammonia in a closed pressure zone at a temperature within the approximate range of 185°–450° C. Under these conditions some guanidine, as the thiocyanate, is invariably obtained, and at temperatures above 270° C. melamine is obtained in addition.

The following are specific examples of the invention, designed to illustrate but not to limit the same.

Example 1

0.261 mole of carbon disulfide and 0.94 mole of ammonia are heated in a 300-cc. autoclave for 5 hours at 350° C. The autoclave is then cooled, vented, and the reaction mass (containing guanidine thiocyanate and melamine) is scraped out into a small volume of water, e. g., about 50 cc. Guanidine thiocyanate is very soluble and dissolves in the water, leaving the insoluble melamine behind. The solution is then filtered. The filtrate contains principally aqueous solutions of guanidine thiocyanate and ammonium thiocyanate. Guanidine values can be separated by the addition of ammonium nitrate, thereby precipitating the sparingly soluble guanidine nitrate which is then filtered. The yield of guanidine thiocyanate, based on carbon disulfide, is 47.6%. The wet melamine above-mentioned, is washed with cold water and dried to give a yield of 14%. Such a high yield of guanidine is surprising, since an amount of ammonium thiocyanate (9.75 g.) equivalent to this same amount of guanidine thiocyanate, when heated under the same ammonia pressure and at the same temperature and time, gives no detectable amount of guanidine.

Various other methods well known in the art for separating guanidine thiocyanate from melamine can also be used.

Example 2

24 g. of ammonia (1.42 moles) and 100 g. of carbon disulfide (1.31 moles) were heated in a 300-cc. autoclave for about 3 hours at about 250° C. The maximum pressure developed during the reaction was 1230 lb./sq. in.; the pressure will vary according to the amount of loading in the autoclave. Guanidine thiocyanate was obtained in a yield of 45.0%.

The time of reaction for obtaining good yields of guanidine depends upon the temperature. At 185° C. some guanidine thiocyanate is obtained after 2 hours, but about 8–20 hours is required for equilibrium. At 240° C. some guanidine thiocyanate is obtained in a few minutes, and equilibrium is attained in about 2–3 hours. When guanidine is the product mainly desired, the preferred temperature is 250°–350° C., using an $NH_3:CS_2$ mole ratio of about 1–6:1.

The isolation of the guanidine thiocyanate may be effected by any of the conventional means, such as by aqueous solution to cause crystallization, or by treating the reactor product with water, filtering undissolved melamine, evaporating the filtrate to dryness, and extracting guanidine thiocyanate from the dry solids with ethyl acetate. Guanidine values can also be isolated by forming a less soluble salt, such as a picrate, nitrate, or a phosphate. The preparation of such less soluble salts is effected by simply adding an equivalent amount of the corresponding ammonium or metal salt of the acid to the aqueous solution of the thiocyanate, and inducing crystallization by any conventional means, such as those above mentioned. A preferred method of recovery is to add ammonium nitrate to an aqueous solution of guanidine thiocyanate, thereby precipitating the less soluble guanidine nitrate.

The duration of the reaction necessary to form melamine varies with the temperature, ammonia and carbon disulfide partial pressures, and autoclave loading. In the lower region of the workable range, namely at 270° C., the reaction time should be at least 1 hour in order to obtain appreciable amounts of melamine but can go as high as 10 hours; 5 hours' reaction time is preferred at this temperature. On the other hand, when working in the higher regions, such as 350° C. and above, it is preferred to use only a brief reaction time. One hour suffices at 350° C. and about 15 minutes at 450° C.

While the invention has been described with particular reference to specific embodiments, it is to be understood that it is not to be limited thereto but is to be construed broadly and restricted solely by the scope of the appended claims.

This is a continuation-in-part of applicant's copending Serial Nos. 84,741 and 84,742 both filed on March 31, 1949, both now abandoned.

I claim:

1. The method of preparing guanidine thiocyanate comprising reacting carbon disulfide and ammonia in a closed reaction zone, at a temperature within the approximate range 185°–450° C.

2. The method comprising subjecting carbon disulfide to ammonia pressure under a temperature of about 240° C. whereby guanidine thiocyanate is formed, and recovering the thus-formed guanidine.

3. The method of preparing guanidine thiocyanate comprising heating ammonia and carbon disulfide in a mole ratio of approximately 1–6:1 in a closed reaction zone for about 3 hours at a temperature of about 240° C., and recovering the thus-formed guanidine thiocyanate.

4. The method comprising heating carbon disulfide and ammonia in a closed reaction zone at a temperature in the approximate range 270°–450° C., whereby melamine is formed, and recovering the thus-formed melamine.

5. The method comprising reacting carbon disulfide and ammonia at a temperature of about 350° C. in a closed reaction zone for a period of time ranging from about 1 to about 10 hours, whereby melamine is formed, and recovering the thus-formed melamine.

6. The method of preparing melamine comprising heating carbon disulfide and ammonia in the approximate mole ratio of 3:1, in a closed reaction zone at a temperature within the range 270°–450° C.

NAT H. MARSH.

No references cited.